United States Patent [19]
Hayashi

[11] Patent Number: 5,900,824
[45] Date of Patent: May 4, 1999

[54] METHOD FOR TRANSFERRING DATA DETECTED BY A PLURALITY OF SENSORS

[75] Inventor: Yasukazu Hayashi, Niwa-gun, Japan

[73] Assignee: Okuma Corporation, Nagoya, Japan

[21] Appl. No.: 08/893,255

[22] Filed: Jul. 16, 1997

[30] Foreign Application Priority Data

Jul. 23, 1996 [JP] Japan .................................. 8-193636

[51] Int. Cl.[6] ................................................ G08C 19/10
[52] U.S. Cl. ............................. 340/870.11; 340/870.07; 340/825.08; 370/455
[58] Field of Search ...................... 340/870.11, 870.07, 340/825.49, 825.06, 825.07, 825.08; 371/69.1; 370/377, 455, 461

[56] References Cited

U.S. PATENT DOCUMENTS

| | | | |
|---|---|---|---|
| 4,019,172 | 4/1977 | Srodes | 371/69.1 |
| 5,163,056 | 11/1992 | Hagiwara | 371/37.4 |
| 5,170,338 | 12/1992 | Moritoki | 364/131 |
| 5,204,865 | 4/1993 | Moritoki | 371/67.1 |
| 5,479,421 | 12/1995 | Takebe | 371/69.1 |

*Primary Examiner*—Michael Horabik
*Assistant Examiner*—Albert K. Wong
*Attorney, Agent, or Firm*—Oliff & Berridge, PLC

[57] ABSTRACT

To improve the flexibility in changing a transfer procedure and the efficiency in transferring data when a plurality of sensors transmit detected data to a detected data receiver. The detected data receiver transmits detected data transfer request command RS simultaneously to a plurality of sensors. A detected data transfer request command RS contains information regarding a network using order, to thereby inform respective sensors of a data transferring order. A sensor which has been requested to carry out data transferring by the command RS detects the completion of data transferring by a sensor which has been requested to carry out data transferring immediately preceding the sensor concerned, and then initiates its own data transferring. With this arrangement, a transfer procedure can be flexibly changed by using a request command RS, and useless intervals between data transfers by respective sensors are omitted.

8 Claims, 3 Drawing Sheets

METHOD FOR TRANSFERRING DATA DETECTED BY A PLURALITY OF SENSORS

BACKGROUND OF THE INVENTION

1. Field of the Invention

This invention relates to a data transferring method for transferring data detected by a plurality of sensors to a detected data receiver. In particular, this method is applied where a plurality of sensors are connected to a bus connection type serial communication network, and achieves efficient transfer of data detected by these sensors to a detected data receiver.

2. Description of the Prior Art

FIG. 6 is a diagram showing the structure of a device for controlling the position of a movable table. This structure is commonly applied to the devices employing a conventional data transferring method (described later) and the data transferring method of the present invention.

As shown in the drawing, a plurality of sensors are used in this structure so as to ensure accurate control of the position. For instance, a motor 5 is provided with a rotary encoder 1, which is a sensor for detecting the rotation position and speed of the rotor shaft 6 of the motor 5. The rotor shaft 6 is directly connected to a ball screw 7, so that the table is moved linearly due to the rotation of the ball screw 7. The linear movement of the table 8 is detected by another sensor, i.e., a linear encoder 2. For more accurate positional control, a temperature sensor 3 is provided. According to the temperature measured by this sensor 3, the expansion rate of the ball screw 7 is taken into consideration in the control. These sensors are all connected to a bus connection type serial communication network 9, so that detected data are transferred to a servo motor controller 4 via the serial communication network 9. The servo motor controller 4 controls the position of the table 8 based on the data detected by the above sensors. Conventionally, detected data transferring has been controlled by means of exchanging communication data as shown in the timing charts of FIG. 7 or 8, in which the time axis extends to the right.

In the method relating to the timing chart of FIG. 7, the servo motor controller 4 sequentially transmits detected data transfer request commands R1, R2, and R3 to the respective sensors for polling. That is, the servo motor controller 4 waits for the completion of detected data transferring by any one of the sensors before it transmits another transfer request command to the next sensor. With this arrangement, signal collision in the network is prevented. In this method of transmission, transfer request commands R1, R2, and R3 respectively addressing the rotor encoder 1, a linear encoder 2, and the temperature sensor 3 and detected data SD1, SD2, and SD3 respectively outputted by those sensors are sequentially and alternately transmitted via the serial communication network 9.

In the method relating to the timing chart shown in FIG. 8, all of the sensors are set beforehand with data on a required elapsed time from the receipt of a command RQ to the start of transferring detected data. In this event, elapsed times T1, T2, and T3 for respective sensors are determined different from one another and, moreover, they need to be somewhat long so as to secure sufficient time to prevent collision of transferring data in the network. In this method of transmission, when the servo motor controller 4 outputs one transfer request command RQ to the serial communication network 9, all of the sensors involved, i.e., the rotary encoder 1, the linear encoder 2, and the temperature sensor 3, detect this command RQ, and output, in this order, detected data SD1, SD2, and SD3 in time T1, T2, and T3, respectively.

The transferring method relating to FIG. 7 is advantageous in that the transfer procedure of detected data can be flexibly changed since transfer request commands are transmitted individually to the respective sensors. However, frequent transmission of such commands results in the problem of imposing a heavy load on a detected data receiver, or the servo motor controller 4. More seriously, a high occupancy rate of transfer request commands in a network causes a drop in the efficiency of transferring detected data.

The transferring method relating to FIG. 8, on the other hand, lacks flexibility because detected data must be transmitted from the respective sensors only in a predetermined order, although it can result in a reduced rate of transmission of transfer request commands. Still more seriously, since a preset time for each sensor is defined as a rather long time in order to prevent data collision in the network, transmission efficiency cannot be improved as much as would be expected, in spite of reduced number of command transmissions.

SUMMARY OF THE INVENTION

The present invention has been conceived to overcome the above problems, and aims to provide a method for transferring detected data from a plurality of sensors with increased transferring efficiency, in which the procedure for transferring these data can be flexibly changed.

This method for transferring data detected by sensors according to the present invention is one example of a data transferring method for transferring data detected by a plurality of sensors to a detected data receiver via a serial communication network of a bus connection type to which the respective sensors are connected. In this transferring method, a detected data receiver transmits a detected data transfer request command which indicates a network using order for the respective sensors in data transferring; and any of the sensors observes a signal in the serial communication network, and performs its own data transferring upon detection of the completion of data transferring by a sensor designated to transfer data detected immediately preceding the sensor observing by the network using order.

According to the present invention, detected data transfer request commands are transmitted only a few times, similar to the method relative to FIG. 8. Moreover, a transfer procedure can be flexibly and easily changed by changing the structure of respective sensors and the order of transferring data from them. Also, there is no need to set a long elapsed time for respective sensors to prevent data collision since the sensor for which data transferring is requested starts transferring data in synchronism with the completion of data transferring by an immediately preceding sensor in terms of the data transferring order. This enables an increase in the efficiency in detected data transferring, compared to the conventional method shown in FIG. 8.

BRIEF DESCRIPTION OF THE DRAWINGS

The above and the other objects, features, and advantages, will become further apparent from the following description of the preferred embodiment taken in conjunction with the accompanying drawings wherein.

DESCRIPTION OF THE PREFERRED EMBODIMENTS

Figure 6:
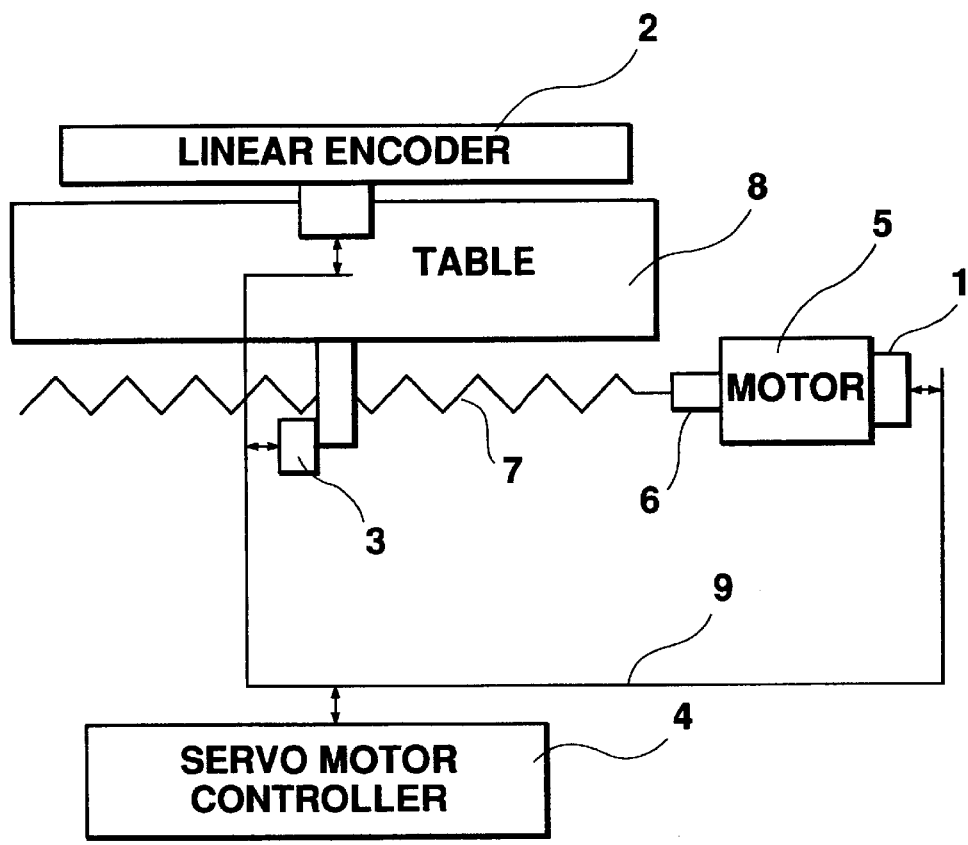
FIG. 6 is a diagram showing an example in which a plurality of sensors are connected to a detected data receiver via a serial communication network of a bus connection type.
Figure 7:
FIG. 7 is a timing chart showing the frame sequence of communication data used in a conventional data transferring method; and, FIG. 8 is a timing chart showing the frame sequence of communication data used in another conventional data transferring method.
Figure 8:
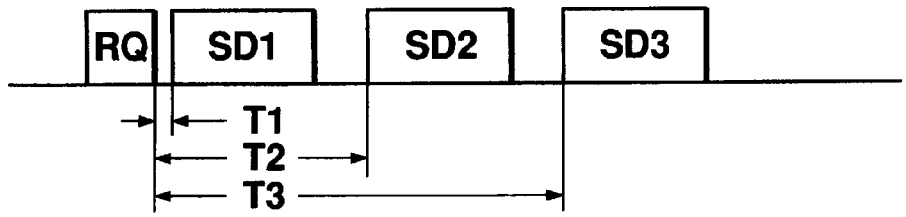

The present invention will be described as being applied to a position controller for a movable table, based on the accompanying drawings. The positions of and mutual connecting relationship between the respective members of the position controller are identical to those shown in FIG. 6, which has been referred to in the description of the prior art, and the explanations thereof are thus omitted here. In the following, FIG. 6 is again referred to.

Figure 1:
FIG. 1 is a timing chart showing a frame sequence of communication data used in a data transferring method of the present invention.

FIG. 1 is a timing chart showing the state of exchanging communication data in a data transferring method of the present invention. In this method, a detected data receiver, or a servo motor controller 4, first transmits a detected data transfer request command RS to specify the order in which respective sensors will use a serial communication network 9 (a network using order). This command RS addresses all the sensors involved so that they can be informed of a network using order in a single transmission of a command RS. The respective sensors then output detected data SD1, SD2, and SD3 to the serial communication network 9 sequentially according to the informed network using order.

Figure 2:
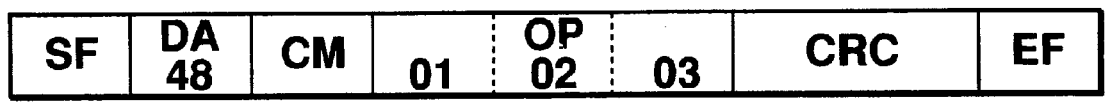
FIG. 2 is a schematic diagram showing the frame structure of a detected data transfer request command RS.
Figure 3:
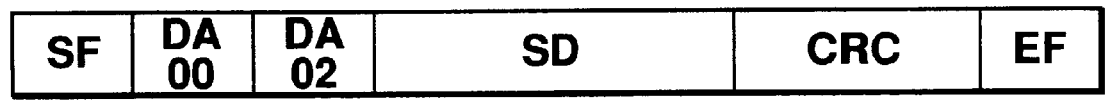
FIG. 3 is a schematic diagram showing the frame structure of detected data SD2.

The operation of the above will next be described in detail. FIGS. 2 and 3 are schematic diagrams showing the structures of the communication frames of a detected data transfer request command RS and of detected data SD2, respectively, in which the leftmost frame is a leading frame. The communication frames each comprise, from its head to end, a start flag SF indicating the start of a frame, a code part DA indicating either a transfer destination address or response contents, a code part CM or SA indicating either a command or a transfer source address, a data part OP or SD indicating the parameter or information contents of a command, a code part CRC for checking errors in the frame, and an end flag EF indicating the end of the frame.

Transfer destination or source addresses are determined in advance for indicating a transfer destination or source in a network. For instance, the address of a servo motor controller 4 is defined as "00", an address given to a master, and the addresses of other sensors, including a rotary encoder 1, a linear encoder 2, and a temperature sensor 3, are defined as "01", "02", and "03", respectively, which are addresses given to slaves. Another transfer destination address "48" is also determined so as to designate the above three sensors collectively as a group.

Figure 4:
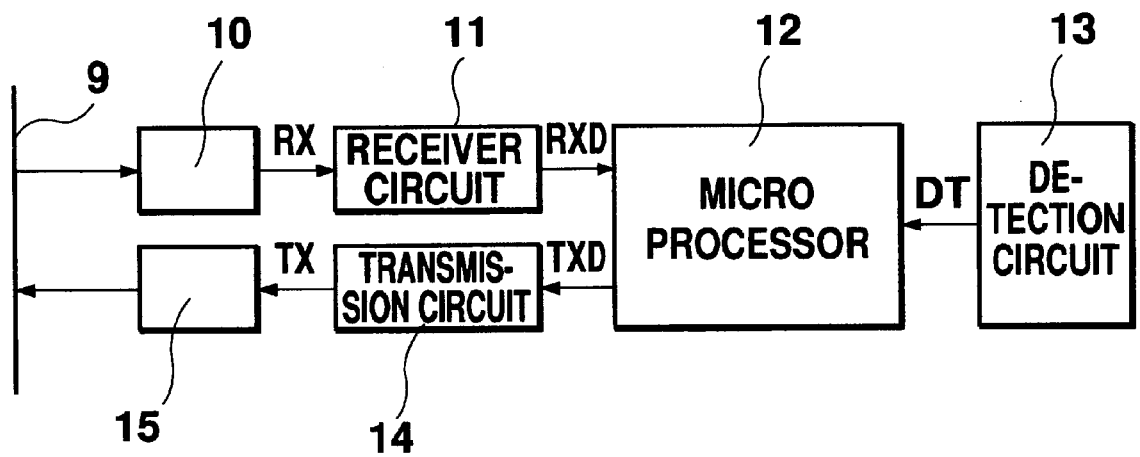
FIG. 4 is a block diagram showing the sections involved in communication processing by a linear encoder.
Figure 5:
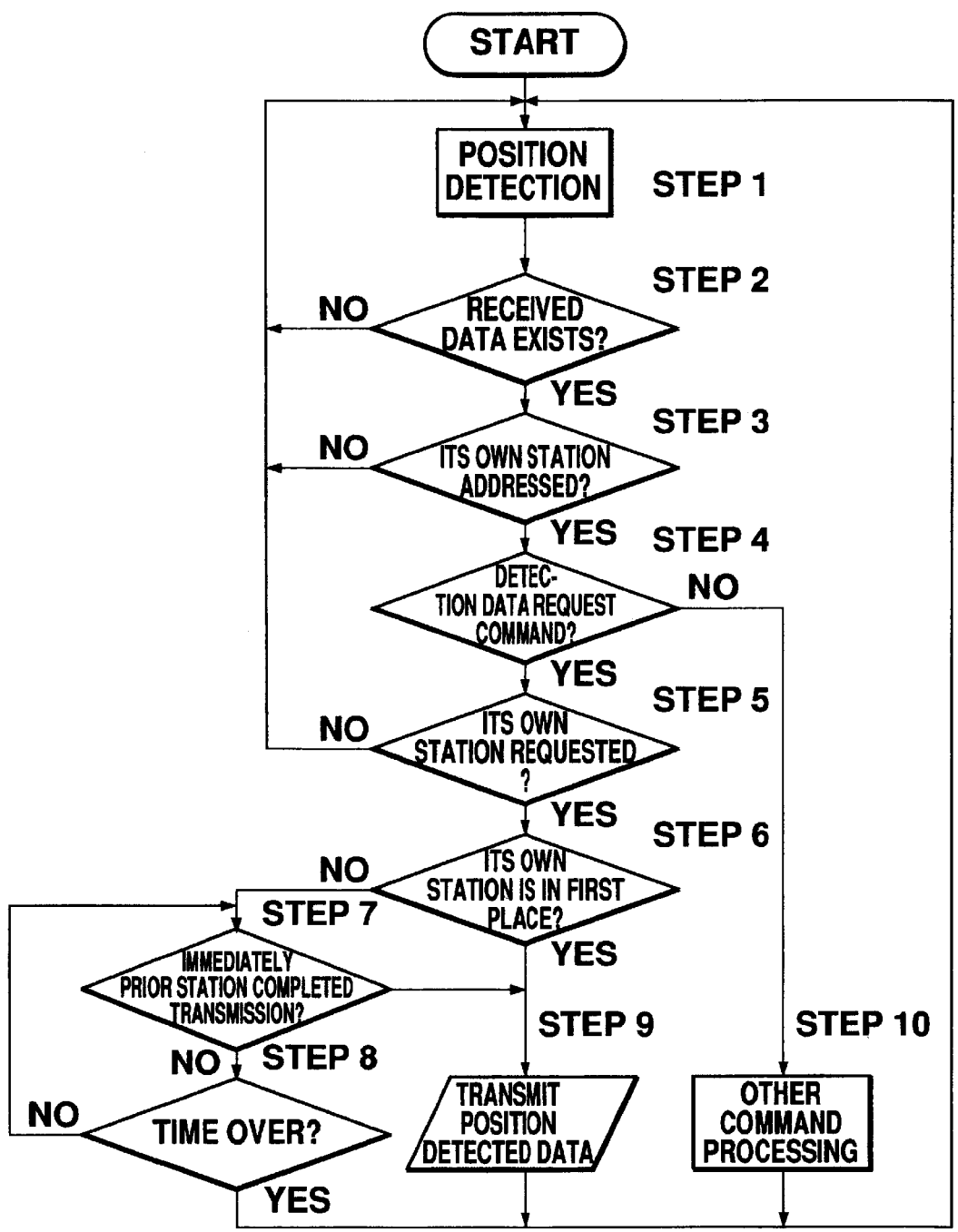
FIG. 5 is a flowchart showing the processes performed by the micro processor of a sensor.

FIG. 4 is a block diagram showing respective sections involved in communication processing by the linear encoder 2. Note that communication processing-related sections in other sensors and the servo motor controller 4 have identical structures to the above. FIG. 5 is a flowchart showing a process performed by the micro processor 12 of the linear encoder 2.

At the beginning of data transferring, the servo motor controller 4 modulates a detected data transfer request command RS into serial data via its transmission circuit, and outputs the command RS in the form of serial data to the serial communication network 9 via a driver thereof. The communication frame of a detected data transfer request command RS includes an address "48" in the transfer destination address part DA, as shown in FIG. 2, and it is thus known that this command RS addresses the three sensors. In this case, the command code part CM identifies the communication frame concerned being a detected data transfer request command, which is directed to a plurality of sensors. The data section OP stores data indicating an order in which sensors will perform data transferring with respect to the serial communication network 9, i.e., a network using order. A network using order is indicated by the sequence of sensor addresses arrayed in an order in which respective sensors are requested to perform data transferring. In this drawing, the data part OP stores data of the addresses "01", "02", and "03" in this sequence, and thereby instructs the rotary encoder 1, the linear encoder 2, and the temperature sensor 3 to perform data transferring in this sequence, using the serial communication network 9.

In the following, the operation of a sensor will be described, taking the linear encoder 2 as an example. In this example, the linear encoder 2 is instructed to perform data transferring in the second place. In the linear encoder 2, the receiver 10 receives a signal from the serial communication network 9, and converts it into a serial electrical signal RX at a certain level. It then sends the serial electrical signal RX to a receiving circuit 11, where the signal RX is demodulated into a digital signal RXD. On the other hand, a micro processor 12 repeats position detection based on a signal DT supplied by a detection circuit 13, following the flow chart shown in FIG. 5, until it receives any communication frame from the serial communication network 9 (STEP 1 and 2 in FIG. 5).

When it has received a communication frame, the micro processor 12 refers to the transfer destination address part DA of the frame to check whether or not that frame designates its own sensor, i.e., the linear encoder 2 here, as its transfer destination. If the received frame is the frame as shown in FIG. 2, the transfer destination address part DA contains data indicating a group address "48", which designates the group including the linear encoder 2, and the micro processor 12 continues processing the received communication frame (STEP 3). Subsequently, the micro processor 12 judges whether or not the received communication frame is a detected data transfer request command RS, based on the data in its command part CM (STEP 4).

When the frame turns out to be a detected data transfer request command RS, which addresses a plurality of sensors, the micro processor 12 checks whether or not the data part OP of the command RS contains the address number of its own sensor (STEP 5). In this example, the address number of the linear encoder 2 is present in the OP section, and the micro processor thus proceeds to judge whether or not the address of its own sensor is located in the first place in the address array, in other words, whether or not its own sensor is requested to perform data transferring immediately (STEP 6). As the address concerned is found in the second position in the array in this example, the micro processor 12 proceeds to the following step, namely, STEP 7. Note that if the concerned address is found in the first position, the micro processor 12 proceeds to STEP 9 instead, where the relevant sensor immediately starts data transferring.

Observing communication frames in the serial communication network 9, the linear encoder 2 detects whether or not the sensor having an address number stored in the OP part as immediately preceding its own address number, namely "01", has completed its data transferring (STEP 7). To be specific, the linear encoder 2 assures the completion of data transferring by the rotary encoder 1 here. At the same time, the linear encoder 2 detects whether or not a timeout has been caused due to errors, etc., occurred in the communication (STEP 8). These processes at STEP 7 and 8 will be repeated until the linear encoder 2 detects either the completion of data transferring by the rotary encoder 1 or a timeout.

When the linear encoder 2 receives a detected data frame SD1 from the rotary encoder 1, and recognizes the end flag EF thereof, it judges that the turn has come for itself to perform data transferring (STEP 7) and then starts data transferring (STEP 9). At STEP 9, the linear encoder 2 outputs a detected data frame SD2 as shown in FIG. 3 to the serial communication network 9. This detected data frame SD2 stores a code "00", the address number of the servo controller 4, in its transfer destination address part DA; a code "02", that of the linear encoder 2, in its transfer source address part SA; and a detected linear position in its data section SD. The micro processor 12 converts this data frame SD2 into a digital signal TXD, and outputs it to the transmission circuit 14. The transmission circuit 14 then modulates the signal TXD into a serial signal TX, and outputs it into the driver 15. The driver 15 in turn converts the signal level of the signal TX, and outputs it to the network 9.

Note that although data transferring is terminated at STEP 7 and 8 in FIG. 5 when a timeout is detected while waiting for the completion of data transferring by an immediately preceding sensor, it may be arranged for the process to proceed to STEP 9 so as to start data transferring even if a timeout is detected.

The above mentioned processing is similarly performed by the temperature sensor 3. That is, the temperature sensor 3 transmits detected data as a data frame SD3 after the completion of transferring a data frame SD2. The rotary encoder 1 also performs the same processing except that the process proceeds from STEP 6 directly to STEP 9 after the receipt of a data transfer request command frame RS since the initial address in the frame RS indicates that of the rotary encoder 1, i.e., "01". At STEP 9, the rotary encoder 1 outputs detected data as a data frame SD1.

According to the above data transferring method, a plurality of sensors can be requested to perform data transferring with a single detected data transfer request command RS. In addition, a transfer procedure can be flexibly and easily changed by changing the address numbers of sensors and their order for data transferring. Furthermore, it is not necessary to set a fairly long time for collision prevention between data transfers by sensors. As a result, the efficiency in transferring detected data from a plurality of sensors is improved, and the flexibility in changing transfer procedure is increased.

What is claimed is:

1. A data transferring method for transferring data detected by a plurality of sensors to a detected data receiver via a bus connected type serial communication network to which the sensors are connected, wherein, the detected data receiver transmits a detected data transfer request command to all of the sensors specifying a network using order which provides the order in which the sensors will transfer data to the detected data receiver, and a sensor transfers data if it is first in the network using order or if it detects completion of data transferred by a sensor having a network using order number immediately preceding its own.

2. A data transferring method as defined in claim 1, wherein the sensors are each given a sensor identification number, and the network using order is specified by a sequence of sensor identification numbers that are included in the detected data transfer request command.

3. A data transferring method as defined in claim 2, wherein the sensors each detect the detected data transfer request command, determine whether or not its own sensor identification number is included in the network using order included in the detected data transfer request command, and wait for its turn to transfer data when its own sensor identification number is included in the network using order.

4. A data transferring method as defined in claim 3, wherein the sensors wait for their turns to transfer data do not transfer data when a waiting time exceeds a predetermined period of time.

5. A data transferring method as defined in claim 2, wherein, each sensor whose turn it is to transfer data outputs a signal to the serial communication network which includes its own sensor identification number.

6. A data transferring method as defined in claim 5, wherein, each sensor stores a sensor identification number of a sensor having a network using order immediately preceding its own, and determines whether it is its turn to transfer data by detecting a coincidence between the stored sensor identification number of the sensor having the network using order immediately proceeding its own, and the sensor identification number read from the signal outputted.

7. A data transferring method as defined in claim 5, wherein the signal outputted by each of the sensors further includes data detectable by other sensors.

8. A data transferring method as defined in claim 7, wherein each sensor stores a sensor identification number of a sensor having a network using order immediately preceding its own, and determines whether it is its turn to transfer data by detecting a coincidence between the stored sensor identification number of the sensor having the network using order immediately proceeding its own, and the sensor identification number read from the signal outputted.

\* \* \* \* \*